(12) United States Patent
Lee et al.

(10) Patent No.: US 9,623,496 B2
(45) Date of Patent: Apr. 18, 2017

(54) INSERT FOR SLOT MILLING (71) Applicants: Jung Woo Lee, Seoul (KR); Taeg Won Lee, Seoul (KR); Byung Sun Choi, Seoul (KR); Dong Ryong Ji, Seoul (KR); Dong Bok Park, Seoul (KR)

(72) Inventors: Jung Woo Lee, Seoul (KR); Taeg Won Lee, Seoul (KR); Byung Sun Choi, Seoul (KR); Dong Ryong Ji, Seoul (KR); Dong Bok Park, Seoul (KR)

(73) Assignee: KORLOY, INC, Seoul (KR)

( * ) Notice: Subject to any disclaimer, the term of this patent is extended or adjusted under 35 U.S.C. 154(b) by 128 days.

(21) Appl. No.: 14/362,910

(22) PCT Filed: Oct. 25, 2012

(86) PCT No.: PCT/KR2012/008805
§ 371 (c)(1),
(2) Date: Jun. 4, 2014

(87) PCT Pub. No.: WO2013/085145
PCT Pub. Date: Jun. 13, 2013

(65) Prior Publication Data
US 2015/0251255 A1 Sep. 10, 2015

(30) Foreign Application Priority Data

Dec. 6, 2011 (KR) ........................ 10-2011-0129571

(51) Int. Cl.
*B23C 5/22* (2006.01)
*B23C 5/08* (2006.01)
(Continued)

(52) U.S. Cl.
CPC ................. *B23C 5/22* (2013.01); *B23C 5/02* (2013.01); *B23C 5/08* (2013.01); *B23C 5/2221* (2013.01);
(Continued)

(58) Field of Classification Search
CPC ....... B23C 5/08; B23C 5/2265; B23C 5/2472; B23C 5/02; B23C 5/2221; B23C 5/202; B23C 2210/161
See application file for complete search history.

(56) References Cited

U.S. PATENT DOCUMENTS 3,200,474 A * 8/1965 Kralowetz ................ B23C 3/06
407/46
7,121,769 B2 * 10/2006 Satran ....................... B23C 5/08
407/40
(Continued)

FOREIGN PATENT DOCUMENTS

JP 50-92977 U 8/1975
JP 11-019817 A 1/1999
(Continued)

*Primary Examiner* — Will Fridie, Jr.
(74) *Attorney, Agent, or Firm* — AKC Patents, LLC; Aliki K. Collins (57) ABSTRACT

The present invention relates to an insert for slot milling, and more specifically, to an insert for slot milling which can smoothly form a front end surface of a concave portion of a slot formed at a cutting target, and provides a safe use thereof by preventing the erroneous installation of cutting inserts coupled with insert-installation seats on both sides of a milling cutter body to prevent damage of the cutting inserts and the milling cutter. To this end, the present invention is characterized in that the plurality of cutting inserts are provided around the slot milling cutter body, one of two cutting inserts protrudes with respect to one side of the milling cutter body and the other protrudes with respect to the opposite side of the milling cutter body, and two cutting inserts are formed with different structures to prevent the erroneous installation thereof on the insert-installation seats prepared on both sides of the milling cutter body.

4 Claims, 7 Drawing Sheets

(51) Int. Cl.
*B23C 5/02* (2006.01)
*B23D 37/00* (2006.01)

(52) U.S. Cl.
CPC *B23C 2200/0455* (2013.01); *B23C 2200/128* (2013.01); *B23C 2200/165* (2013.01); *B23C 2200/367* (2013.01); *B23C 2210/168* (2013.01); *B23C 2210/325* (2013.01); *Y10T 407/1936* (2015.01); *Y10T 407/1942* (2015.01)

(56) References Cited

U.S. PATENT DOCUMENTS

| | | | | |
|---|---|---|---|---|
| 8,662,798 | B2 * | 3/2014 | Leisner | B23C 5/241 407/41 |
| 9,004,823 | B2 * | 4/2015 | Ejderklint | B23C 5/08 407/34 |
| 2005/0117981 | A1 * | 6/2005 | Satran | B23C 5/08 407/117 |

FOREIGN PATENT DOCUMENTS

| | | |
|---|---|---|
| JP | 4588716 B2 | 9/2010 |
| KR | 10-2011-0005282 A | 1/2011 |

\* cited by examiner

INSERT FOR SLOT MILLING

TECHNICAL FIELD

The present invention relates to an insert for slot milling, and more particularly, to an insert for slot milling that can smoothly form a shape of a concave portion of a slot formed in a work material and that can enable safe use of a milling cutter by preventing erroneous coupling of left and right side surfaces of a cutting insert coupled to left and right seats of the slot milling cutter.

BACKGROUND ART

In a cutting processing using a rotation slot milling cutter, a processing of a slot shape is in a trend of gradually increasing, unlike existing slitting use, and when processing such a slot, a processing request quality after a slot processing gradually increases, and as a request of a radius form in a slot corner portion together increases, necessity of improvement of a structure of a cutting insert and a milling cutter appropriate thereto increases.

For reference, the slot milling is to process a concave portion of a concave form.

Figure 1A:
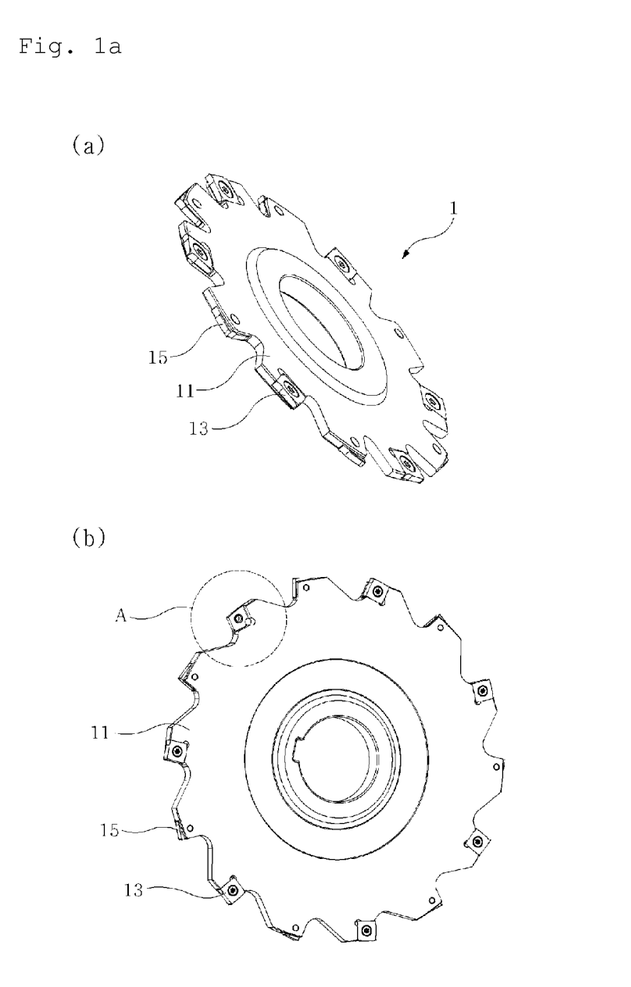
FIG. 1A is a perspective view illustrating an exemplary embodiment of a conventional rotation slot milling cutter.
Figure 1B:
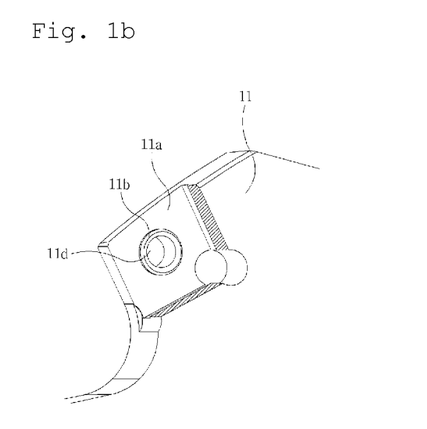
FIG. 1B is a detail view illustrating a portion A of FIG. 1A and illustrating an insert mounting seat structure.
Figure 1C:
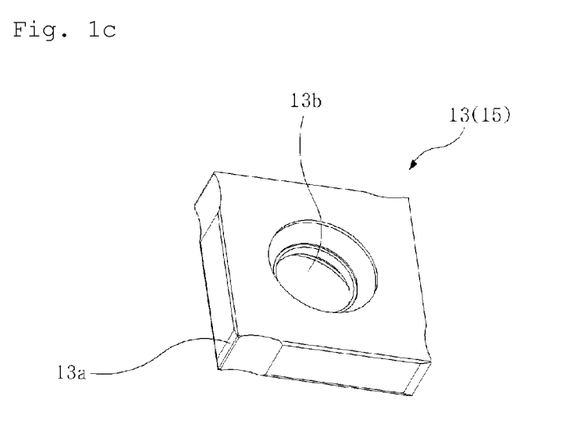
FIG. 1C is a perspective view of a conventional cutting insert.
Figure 1D:
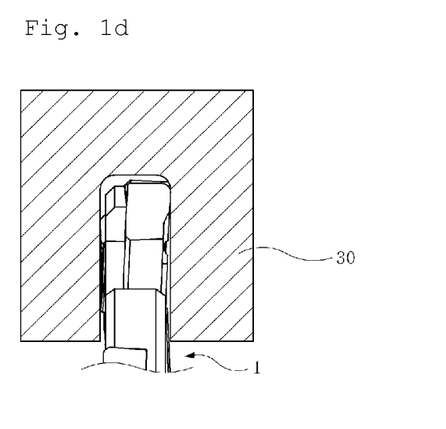
FIG. 1D is a diagram illustrating a state of inserting and processing a cutting insert into a slot of a work material.

FIG. 1A is a perspective view illustrating an exemplary embodiment of a conventional rotation slot milling cutter, FIG. 1B is a detail view illustrating a portion A of FIG. 1A and illustrating an insert mounting seat structure, FIG. 1C is a perspective view of a conventional cutting insert, and FIG. 1D is a diagram illustrating a state of inserting and processing a cutting insert into a slot of a work material.

In general, in a rotation slot milling cutter 1, a plurality of cutting inserts 13 and 15 are provided in a circumference of a slot milling cutter body 11, as shown in the drawings, and one 13 (or 15) of every two cutting inserts 13 and 15 is protruded at one side surface of the milling cutter body 11, and the remaining one 15 (or 13) is protruded at an opposite side surface of the milling cutter body 11.

As shown in FIG. 1C, the conventional cutting inserts 13 and 15 have a structure in which a fastening through hole 13b is formed at the center thereof and in which a cutting edge 13a is formed at one side thereof along a circumference of a body portion of an approximately quadrangular hexahedron shape. An upper surface and a lower surface of the body portion are formed in a flat surface.

Figure 2A:
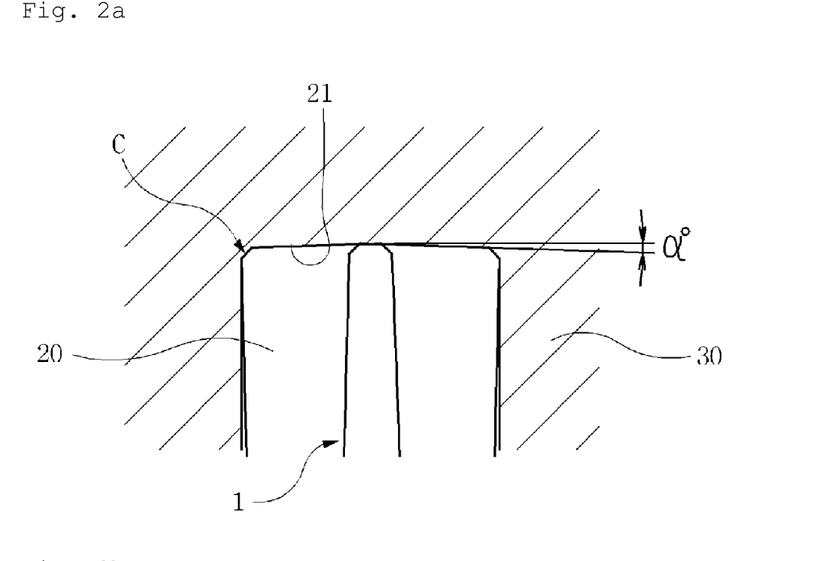
FIGS. 2A and 2B are cross-sectional views comparing structures of slots processed by a conventional insert and an insert according to an exemplary embodiment of the present invention.
Figure 2B:
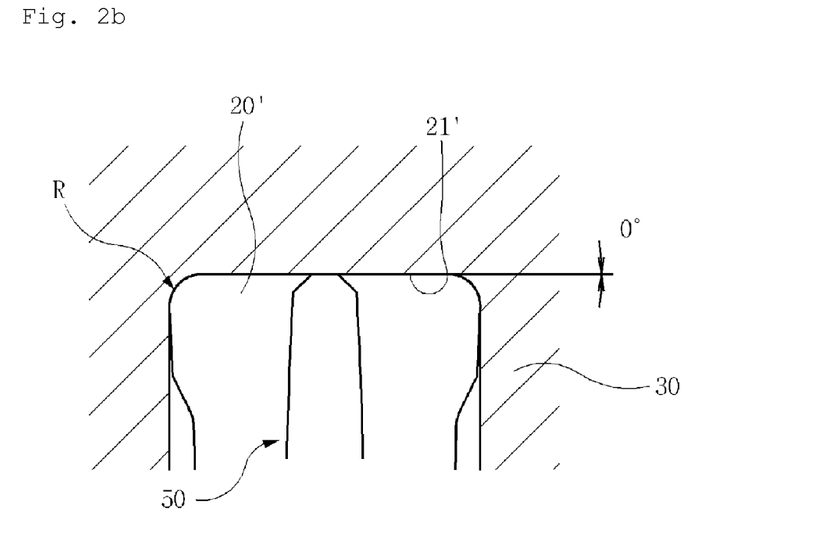

Further, a state of cutting a work material 30 using a conventional rotation slot milling cutter 1 is shown in FIGS. 2A and 2B, and FIGS. 2A and 2B illustrate a state in which an end portion of the slot milling cutter 1 is inserted into a slot of the work material 30.

Particularly, when a cutting edge of a thin width is formed in a radius R shape, a length of an edge portion is reduced by an R value, and thus a shape thereof is changed and distinguished according to a location that couples a cutting insert to both sides (the left side and the right side) of a milling cutter body.

Referring to FIG. 2A, when using the conventional rotation slot milling cutter 1, in a structure of a slot 20 formed in the work material 30, a surface of a front end portion 21 of a slot concave portion is not flat and forms an inclined shape. Therefore, in order to flatly form the front end portion 21 of a concave portion of the slot 20 formed in the work material 30, one surface of the cutting insert should have a surface of a bending shape.

Further, for a smooth slot milling processing, upon processing, a side surface of a cutting insert should form a predetermined allowance angle, and for a required width processing of a slot, it is necessary to prevent confusion of use according to a difference on a shape basis of a cutting insert coupled to a cutting insert mounting portion of both sides of a milling cutter body.

Particularly, in a conventional rotation slot milling cutter of FIG. 1B, as a means for coupling the cutting insert 13 (or 15) to the insert mounting seat 11a formed in one side of the milling cutter body 11, a seat protruded member 11b of a circular protrusion form is formed.

Therefore, the seat protruded member (11b of FIG. 1B) of a circular protrusion shape is inserted into the through hole 11d formed at the center of the cutting insert 13 (or 15) to be fastened by a separate fastening screw (not shown).

However, because the cutting insert 13 (or 15) fastened to an insert mounting seat 11a of the milling cutter 1 in which the circular seat protruded member 11b is formed has a commonly coupled structure regardless of a location of insert mounting seats 11a of both sides, the cutting insert may be erroneously mounted. Therefore, there is a problem that damage of a slot milling insert may occur due to part damage of the cutting insert and the slot milling cutter and there is inconvenience in using the slot milling insert.

DETAILED DESCRIPTION OF INVENTION

Technical Problem

The present invention has been made in view of the above problems, and provides an insert for slot milling in which confusion does not occur when a user uses and that has a structure in which left and right shapes of a cutting insert coupled to each of both sides of a milling cutter body are distinguished and in which a cutting insert is not fastened to an insert mounting seat of the opposite side.

The present invention further provides an insert for slot milling that can improve a processing quality of a slot by having a radius R shape in an edge portion of a cutting insert while maintaining a flat surface without forming a step at a front end surface of a concave portion of a slot after a slot processing by providing an allowance angle in a cutting insert itself and that can thus enhance customer satisfaction.

Technical Solution

In accordance with an aspect of the present invention, a cutting insert for slot milling, wherein a plurality of cutting inserts are provided in a circumference of a slot milling cutter body, one of every two cutting inserts is protruded to one side surface of the milling cutter body, the remaining one is protruded to an opposite side surface of the milling cutter body, and the every two cutting inserts are formed in different structures to prevent from being erroneously mounted in an insert mounting seat provided in each of both side surfaces of the milling cutter body.

Preferably, the cutting insert has an insert groove on a bottom mounting surface that contacts with the insert mounting seat of the milling cutter, and the insert groove is formed in a polygonal groove shape.

Preferably, a polygonal seat protruded member is protruded to an upper portion on an insert mounting seat of the milling cutter to be inserted into an insert groove forming the polygonal groove shape.

Preferably, in the seat protruded member, a through hole is formed on an inside central portion thereof, and a helix is formed on an inner circumferential surface of the through hole and thus a stable coupling structure is formed by fastening by screw coupling.

Preferably, in the cutting insert, a cutting edge of a cutting insert of one side of every two cutting inserts is rounding processed.

Preferably, the cutting insert has a cutting edge at one side thereof along a circumference of a rectangular parallelepiped-shaped body, a through hole for insert coupling at the center thereof, and a space portion of at least one groove form on a protruded surface of the opposite side of an insert fastening surface and thus a cutting load is reduced and a cutting chip is smoothly discharged.

Advantageous Effects

According to a rotation slot milling cutter of the present invention, as structures of every two cutting inserts of a plurality of cutting inserts coupled to each of both sides of a milling cutter body are differently formed, there is a difference in shapes thereof, and by providing a structure in which an opposite cutting insert is not fastened to insert mounting seats of both sides, damage of a cutting insert and a milling cutter due to erroneous mounting of the cutting insert can be prevented, and a user can conveniently use the rotation slot milling cutter.

Further, by providing an allowance angle to a cutting insert itself, after a slot processing, a flat surface is maintained without forming a step in a front end surface of a concave portion of a slot, and by providing a radius shape in an edge portion of a thin width of a cutting insert of one side, a processing quality of the slot is improved and thus customer satisfaction is enhanced.

DESCRIPTION OF SYMBOLS

1,100: rotation slot milling cutter
11,110: milling cutter body 11a, 130: insert mounting seat
11B: seat protruded member (circular) 150: seat protruded member (polygon)
11d, 13b, 53, 155: through hole 13, 15, 50: cutting insert
13a, 51: cutting edge 20, 20': slot
21, 21': slot concave portion front end surface 30: work material
50, 50': cutting insert 52: insert groove (polygon)

Best Modes for Carrying out the Invention

Hereinafter, a rotation slot milling cutter according to an exemplary embodiment of the present invention will be described in detail with reference to the accompanying drawings.

Figure 3:
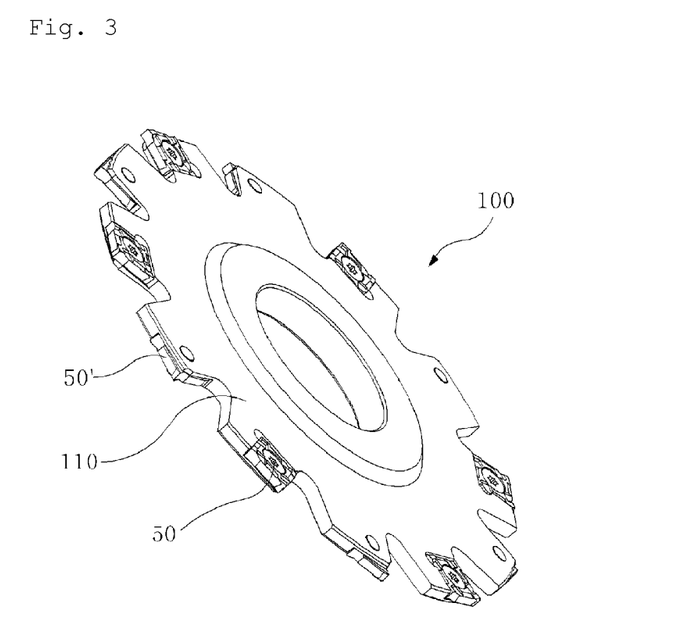
FIG. 3 is a perspective view illustrating a structure of a rotation slot milling cutter in which an insert is mounted according to an exemplary embodiment of the present invention.
Figure 4A:
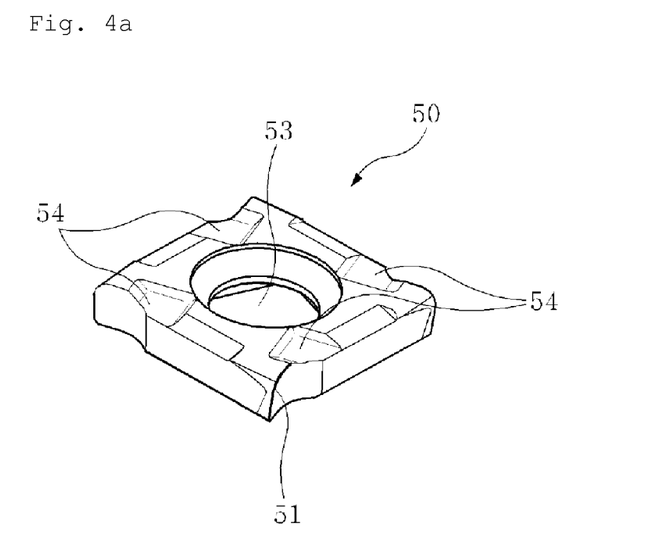
FIGS. 4A to 4C are perspective views illustrating a structure of a cutting insert according to an exemplary embodiment of the present invention and a state in which the cutting insert is fastened to an insert mounting seat of a milling cutter.
Figure 4B:
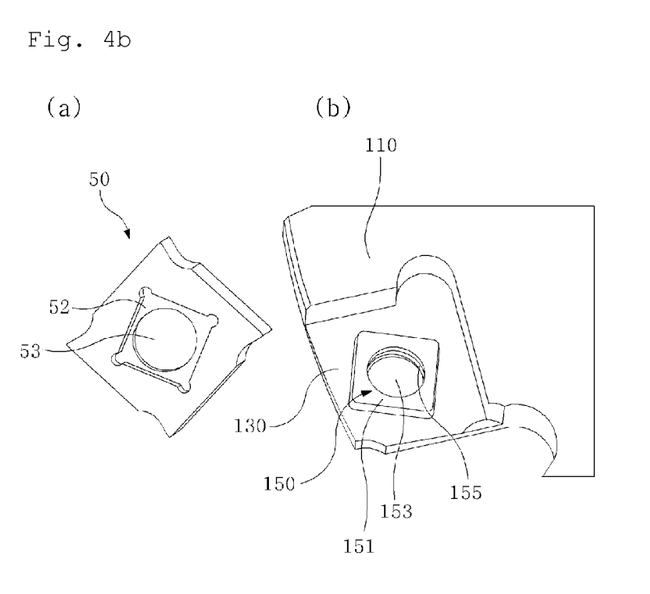
Figure 4C:
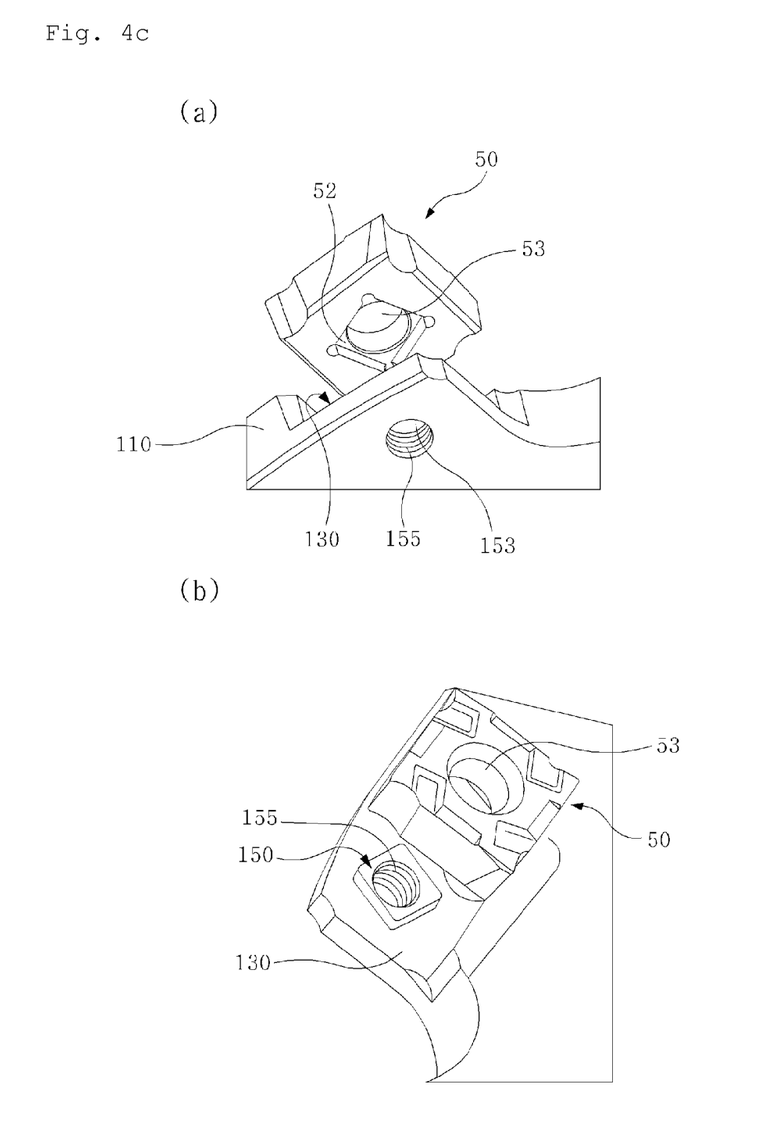

FIG. 3 is a perspective view illustrating a structure of a rotation slot milling cutter in which an insert is mounted according to an exemplary embodiment of the present invention, and FIGS. 4A to 4C are perspective views illustrating a structure of a cutting insert according to an exemplary embodiment of the present invention and a state in which the cutting insert is fastened to an insert mounting seat of a slot milling cutter.

Figure 5A:
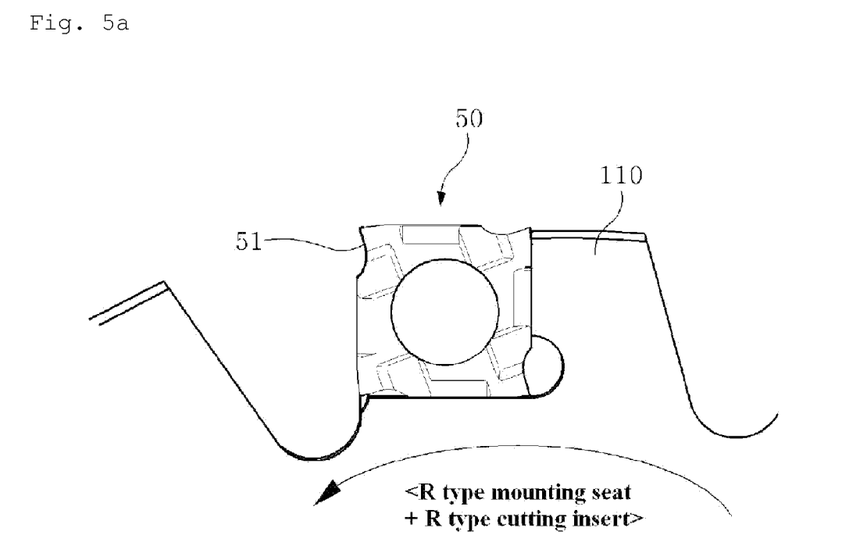
FIGS. 5A and 5B each are diagrams illustrating cases in which a cutting insert is rightly mounted and wrongly mounted in a mounting seat of a milling cutter body according to an exemplary embodiment of the present invention.
Figure 5B:
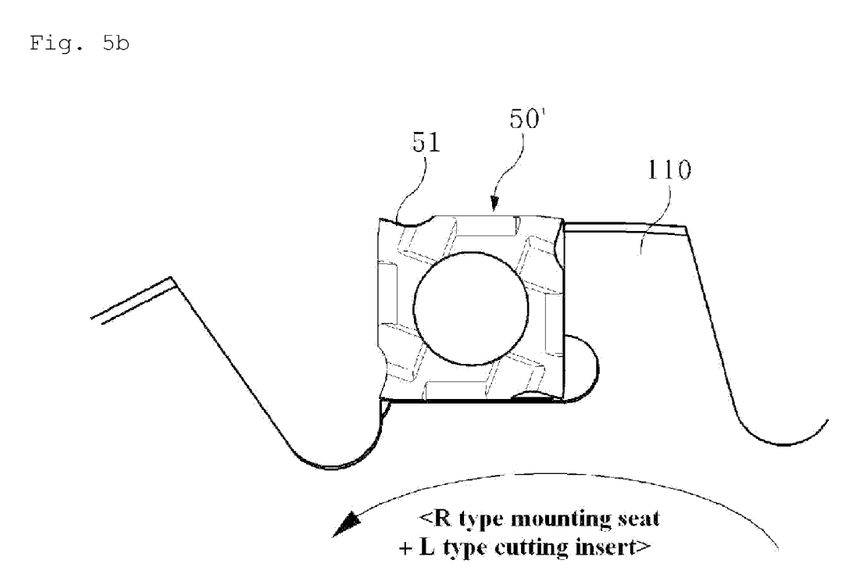

Further, FIGS. 5A and 5B each are diagrams illustrating cases in which a cutting insert is rightly mounted and wrongly mounted in an insert mounting seat of a milling cutter according to an exemplary embodiment of the present invention.

First, referring to FIGS. 3 and 4A to 4C, a cutting insert 50 of the present exemplary embodiment is mounted in a cutting insert mounting seat 130 provided on a main body 110 of a milling cutter 100, and has an approximately quadrangular hexahedron-shaped body, and a cutting edge 51 is formed at one side corner along a circumference of the body. In this case, the cutting edge 51 is formed in a round processor of a radius shape in a cutting insert of any one side of cutting inserts located at both sides.

Further, a groove 54 of a predetermined size is formed on a protrusion surface that contacts with one side surface of each cutting insert 50, i.e., a work material, and the groove 54 may reduce a cutting load and enable smooth discharge of a cutting chip upon cutting by securing a predetermined allowance space between the cutting insert 50 and the work material upon processing a slot.

As shown in FIGS. 4B and 4C, the cutting insert 50 of the present exemplary embodiment has a structure in which an insert groove 52 of a polygonal shape is formed on a mounting surface mounted in the insert mounting seat 130 of the milling cutter 100. A polygonal seat protruded member 150 inserted into and coupled to the insert groove 52 to correspond to the insert groove 52 is formed on the cutting insert mounting seat 130 of the slot milling cutter 100 together with forming of the insert groove 52.

This structure enables to couple a cutting insert of both side surfaces of the milling cutter 100, for example, a right side surface R and a left side surface L of the milling cutter 100 to the insert mounting seat 130 corresponding thereto and prevents an opposite cutting insert 50 (or 50') from being erroneously mounted in the insert mounting seat 130 of the milling cutter 100.

Further, in a structure of the cutting insert 50 of the present exemplary embodiment, each of the insert grooves 52 and 52' of both sides formed on a mounting surface contacting with the cutting insert mounting seat 130 of the milling cutter 100 forms a polygonal shape and thus by differently forming the polygonal structure, erroneous coupling in which the cutting insert 50 coupled to one side surface is mounted in the insert mounting seat 130 of another side surface is prevented. That is, the seat protruded member 150 of the milling cutter 100 coupled to the insert groove 52 formed at one side surface of the cutting insert 50 of the present exemplary embodiment forms a polygon, and when these polygons have different shapes, erroneous mounting of the cutting insert 50 is prevented.

Therefore, in a structure of the cutting insert 50 and the slot milling cutter 100 of the present exemplary embodiment, because damage of a cutting insert and a rotation slot milling cutter by erroneous mounting of the cutting insert 50 can be previously prevented, material damage can be previously prevented.

The polygonal seat protruded member 150 formed in the insert mounting seat 130 of the present exemplary embodiment operates to solve a structural problem hard to stably mount a fastening screw by low rigidity due to a thin thickness of the cutting insert mounting seat 130 remaining as a problem of a rotation slot milling cutter. That is, the seat protruded member 150 formed on an upper surface of the insert mounting seat 130 has a predetermined thickness, thereby reinforcing a thin thickness of the cutting insert mounting seat 130 of the bottom.

In the seat protruded member 150 of the present exemplary embodiment, a through hole 153 for fastening is formed in a central portion of a body 151 having a predetermined thickness, and a helix 155 is formed on an inner circumferential surface of the through hole 153 and thus a fastening force with a fastening screw (not shown) becomes stronger than a conventional case.

FIG. 4B(A) is a perspective view illustrating a fastening surface of a cutting insert 50 according to an exemplary embodiment of the present invention, and FIG. 4B(B) is a top plan view of the insert mounting seat 130 of the milling cutter.

Referring to FIGS. 5A and 5B, FIG. 5A illustrates a case in which a corresponding cutting insert 50 is rightly mounted in the insert mounting seat 130 of the milling cutter, and in this case, the cutting edge 51 of the cutting insert is mounted to correspond with a rotation direction for cutting to appropriately cut.

However, in case of FIG. 5B, when a cutting insert 50' of the opposite side is wrongly mounted in the insert mounting seat 130, by rotating and mounting a cutting edge 51' that should cut to the opposite side, when cutting, the cutting insert 50' is immediately damaged.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

The invention claimed is:

1. A cutting insert for slot milling, wherein a plurality of cutting inserts are provided in a circumference of a slot milling cutter body, one of every two cutting inserts is protruded to one side surface of the milling cutter body, the remaining one is protruded to an opposite side surface of the milling cutter body, and the every two cutting inserts are formed in different structures to be prevented from being erroneously mounted in an insert mounting seat provided in each of both side surfaces of the milling cutter body;

wherein the cutting insert has an insert groove on a bottom mounting surface that contacts with the insert mounting seat of the milling cutter, and the insert groove is formed in a polygonal groove shape;

wherein a polygonal seat protruded member is protruded to an upper portion on an insert mounting seat of the milling cutter so as to be inserted into an insert groove having the polygonal groove shape; and wherein a first insert groove of a first cutting insert protruded to one side surface of the milling cutter body and the polygonal shape of the seat protruded member corresponding to the first insert groove differ from a second insert groove of a second cutting insert protruded to an opposite side surface of the milling cutter body and the polygonal shape of the seat protruded member corresponding to the second insert groove.

2. The cutting insert of claim 1, wherein a through hole is formed on a central portion of the inside of the seat protruded member, and a helix is formed on an inner circumferential surface of the through hole.

3. The cutting insert of claim 1, wherein in the cutting insert, a cutting edge of a cutting insert of one side of every two cutting inserts is rounding processed.

4. A cutting insert for slot milling, wherein a plurality of cutting inserts are provided in a circumference of a slot milling cutter body, one of every two cutting inserts is protruded to one side surface of the milling cutter body, the remaining one is protruded to an opposite side surface of the milling cutter body, and the every two cutting inserts are formed in different structures to be prevented from being erroneously mounted in an insert mounting seat provided in each of both side surfaces of the milling cutter body;

wherein the cutting insert has a cutting edge at one side thereof along a circumference of a rectangular parallelepiped-shaped body, a through hole for insert coupling at the center thereof, and a space portion of at least one groove form on a protruded surface of the opposite side of an insert fastening surface;

wherein the cutting insert has an insert groove on a bottom mounting surface that contacts with the insert mounting seat of the milling cutter, and the insert groove is formed in a polygonal groove shape;

wherein a polygonal seat protruded member is protruded to an upper portion on an insert mounting seat of the milling cutter so as to be inserted into an insert groove having the polygonal groove shape: and wherein a first insert groove of a first cutting insert protruded to one side surface of the milling cutter body and the polygonal shape of the seat protruded member corresponding to the first insert groove differ from a second insert groove of a second cutting insert protruded to an opposite side surface of the milling cutter body and the polygonal shape of the seat protruded member corresponding to the second insert groove.

* * * * *